Patented June 7, 1932

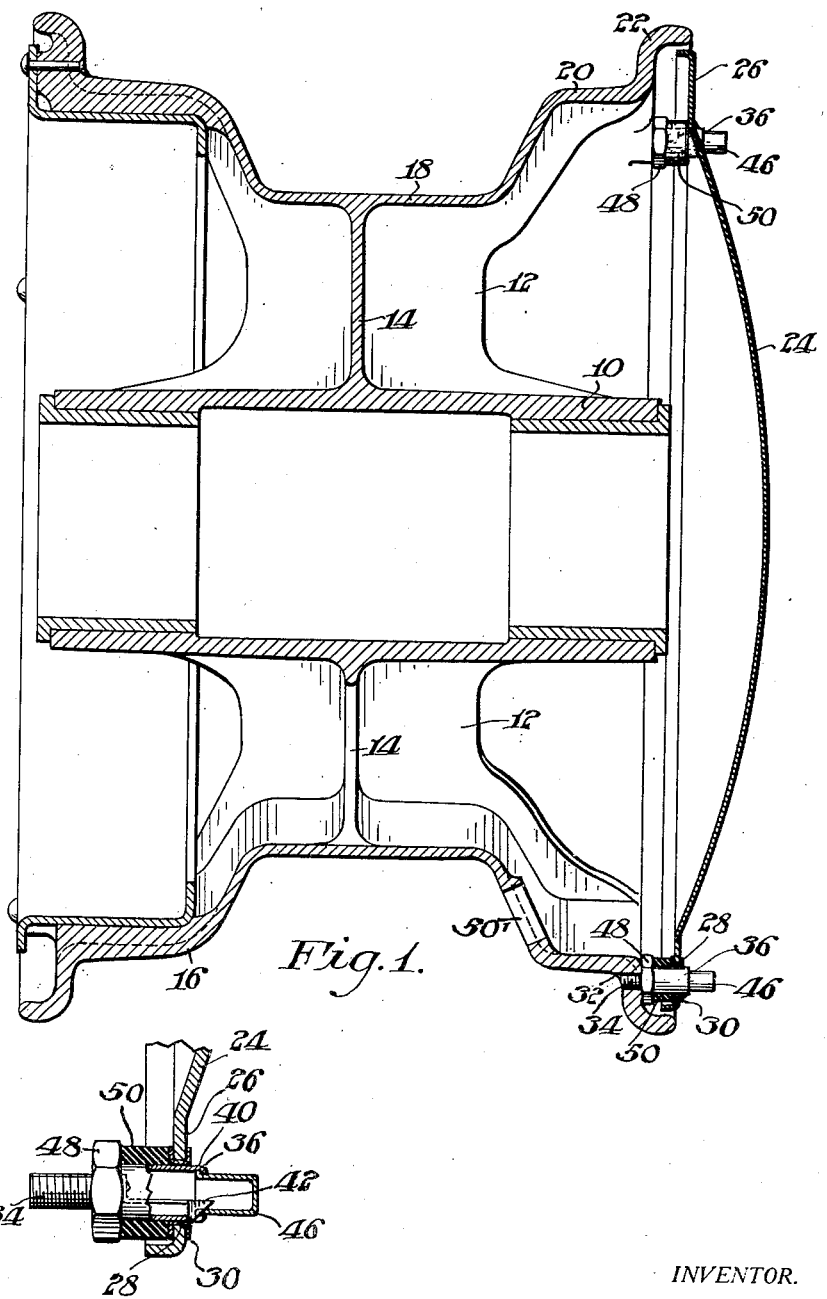

1,861,432

UNITED STATES PATENT OFFICE

JAMES H. BARBER, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF ATTACHING FAIRING TO AIRPLANE WHEELS

Application filed June 24, 1930. Serial No. 463,395.

This invention relates to airplane wheels and more particularly to an airplane wheel which is extremely simple in its construction and to which the outer cover or fairing may be attached with a minimum amount of labor.

The principal object of the present invention is to provide an airplane wheel comprised of a relatively few number of parts so that extreme simplicity results.

An additional object of the invention is to provide an airplane wheel in which the outer cover or fairing may manually be applied or removed without necessitating the use of mechanics' tools and which, when in position, is securely held against removal and against rattling due to vibration.

Yet another object of the invention is to provide an airplane wheel in which the necessity of providing a valve hole in the cover plate is eliminated, the cover being so readily removable that access to the valve may be had without inconvenience.

Still another object of the invention is to provide an airplane wheel employing a cover which may be formed of sheet material and which is consequently light, obtaining a saving in weight over present day wheels.

Other objects of the invention not at this time more particularly enumerated, will become more readily apparent as the nature of the invention is better understood, and the same consists in the novel construction, combination and arrangement of parts shown in the single sheet of drawing, in which Fig. 1 is a sectional view taken axially through the assembled wheel.

Fig. 2 is a fragmentary sectional view of a cinch fastener device employed in connection with the present invention.

The wheel assembly is shown as being formed of a single casting and comprises a hub portion 10 having ribs 12 and webs 14 for attachment to a rim 16. This rim is provided with a drop center 18, horizontal side flanges 20 and vertical side flanges 22, which flanges are adapted to receive the tire beads.

The outer cover or fairing is shown at 24 and comprises a concavo-convex circular disc having a continuous annular flange 26, in which flange are formed a plurality of holes. These holes are adapted to receive the fastening means for the fairing. While any number of holes may be provided in the annular flange 22, it is preferable from a manufacturing standpoint to provide three of these holes equally spaced 120° apart on the cover. Each hole is lined with an eyelet 28, which eyelet is provided with rolled edges 30 for securing the same in the holes.

The flange 22 is provided with a number of threaded bores 32 corresponding in number and position to the holes in the cover plate, and in each of these threaded bores are receivable the shank 34 of a common cinch fastener 36. This cinch fastener is clearly shown in Fig. 2 and is of the well known type universally used in automobile constructions for securing the storm curtains of the vehicle to the body, and no claim is made as to the novelty of the same. This cinch fastener is provided with a male member 40 for extending into the openings 28 in the cover plate. These male members 40 have protruding therefrom, latch members 42, operable upon depression of slidable thumb buttons 46 to be retracted into the members 40 for permitting the cover to be removed. Disposed between the cover 24 and the head 48 of each cinch fastener, is a rubber washer 50, against which the cover is adapted to bear, and be resiliently held in position against rattling.

One side of the drop center 18 of the wheel is provided with a valve opening 50' through which the valve stem of the tire may extend. The plate 24 is devoid of any opening for access to the valve stem, and because of the extreme ease with which this cover may be removed, it is not considered an inconvenience to completely remove the cover every time access is to be had to the valve stem. The operation of installing or removing the cover is quite obvious. It is simply necessary to depress the thumb buttons 46 of the cinch fasteners to withdraw the latch 42 into the casings of the male members 40 so that the rubber washers 50 may force the fairing off of the members 40.

I do not desire to limit myself to the exact arrangement of parts shown in the accompanying drawing and described in this specification as various changes in the details of construction may be resorted to without departing from the spirit of the invention. Only insofar as the invention is particularly pointed out in the accompanying claims is the same to be limited.

What I claim is:

1. The combination with a wheel and an outer cover therefor, of a plurality of fastening posts secured to said wheel, there being holes extending through said cover receivable on said posts and means on said posts to detachably engage the cover at said holes, and a rubber washer disposed on each post between said cover and wheel.

2. A fastening means for securing an outer cover to a wheel comprising a fastener adapted to be secured to the wheel, said fastener having a retractable protuberance associated therewith, and a rubber washer on said fastener, said fastener being adapted to receive the cover thereon between said rubber washer and protuberance.

3. The combination of a wheel member and an end cover therefor, a snap-on fastener to secure the cover against axial displacement, and resilient means held in compression between the wheel and the cover, taking up all lost motion between the cover and the snap-on fastener.

In testimony whereof I hereunto affix my signature.

JAMES H. BARBER.